United States Patent
Iizuka

(10) Patent No.: US 9,154,229 B2
(45) Date of Patent: Oct. 6, 2015

(54) INFORMATION PROCESSING SYSTEM, INFORMATION PROCESSING METHOD, CLIENT DEVICE, AND RECORDING MEDIUM

(71) Applicant: CASIO COMPUTER CO., LTD., Shibuya-ku, Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 15 days.

(21) Appl. No.: 14/031,913

(22) Filed: Sep. 19, 2013

(65) Prior Publication Data

US 2014/0086591 A1 Mar. 27, 2014

(30) Foreign Application Priority Data

Sep. 21, 2012 (JP) ................................ 2012-208904

(51) Int. Cl.
*H04B 10/116* (2013.01)
(52) U.S. Cl.
CPC .................................. *H04B 10/116* (2013.01)
(58) Field of Classification Search
USPC ........................................ 398/103, 118–131
See application file for complete search history.

(56) References Cited

U.S. PATENT DOCUMENTS

| | | | |
|---|---|---|---|
| 6,999,112 B2 | 2/2006 | Seaman et al. | |
| 7,308,194 B2 | 12/2007 | Iizuka et al. | |
| 8,280,398 B2 | 10/2012 | Ishii et al. | |
| 2002/0071677 A1 | 6/2002 | Sumanaweera | |
| 2006/0218627 A1 | 9/2006 | Komatsu | |
| 2007/0275750 A1 | 11/2007 | Nakagawa | |
| 2008/0044188 A1* | 2/2008 | Kagawa et al. | 398/128 |
| 2008/0068196 A1* | 3/2008 | Fujimoto | 340/669 |

(Continued)

FOREIGN PATENT DOCUMENTS

| | | |
|---|---|---|
| JP | 2001243310 A | 9/2001 |
| JP | 2001356981 A | 12/2001 |

(Continued)

OTHER PUBLICATIONS

Japanese Office Action dated Jul. 29, 2014 in counterpart Japanese Application No. 2012-208904.

(Continued)

*Primary Examiner* — David Payne
*Assistant Examiner* — Casey Kretzer
(74) *Attorney, Agent, or Firm* — Holtz, Holtz, Goodman & Chick PC

(57) ABSTRACT

Provided is an information processing system that includes a server and a client device. The server stores identification information and associated content in memory, and transmits the identification information, using light that varies over time as a communication medium. The client device continuously senses and decodes the light varying in time into the identification information, transmits the decoded identification information to the server, receives content transmitted from the server in response to the transmission of identification information, and displays received content. A controller included in the client device detects an operation on the displayed content from an input device, and applies control to transmit process details according to the detection to the server. The server additionally executes the process details transmitted from the client device, and updates the content to content that includes the execution results.

15 Claims, 17 Drawing Sheets

(56) References Cited

U.S. PATENT DOCUMENTS

| | | |
|---|---|---|
| 2008/0167057 A1 | 7/2008 | Miyashita |
| 2010/0123905 A1 | 5/2010 | Aoyama |
| 2011/0290873 A1 | 12/2011 | Nishiguchi et al. |
| 2013/0151422 A1* | 6/2013 | Berry et al. .................. 705/306 |
| 2013/0163994 A1 | 6/2013 | Iizuka et al. |

FOREIGN PATENT DOCUMENTS

| | | |
|---|---|---|
| JP | 2002133198 A | 5/2002 |
| JP | 2003016093 A | 1/2003 |
| JP | 2003-319033 A | 11/2003 |
| JP | 2005070863 A | 3/2005 |
| JP | 2005-284453 A | 10/2005 |
| JP | 2006-020294 A | 1/2006 |
| JP | 2006180217 A | 7/2006 |
| JP | 2006268689 A | 10/2006 |
| JP | 2007-067487 A | 3/2007 |
| JP | 2008085555 A | 4/2008 |
| JP | 2009-087176 A | 4/2009 |
| JP | 2009284079 A | 12/2009 |
| JP | 2010-107235 A | 5/2010 |
| JP | 2010-121972 A | 6/2010 |
| JP | 2010130438 A | 6/2010 |
| JP | 2011199800 A | 10/2011 |
| WO | 01/52131 A1 | 7/2001 |
| WO | WO 2005/074311 A1 | 8/2005 |
| WO | WO 2005/086375 A1 | 9/2005 |
| WO | 2006/098235 A1 | 9/2006 |

OTHER PUBLICATIONS

U.S. Appl. No. 13/719,528, First Named Inventor: Nobuo Iizuka, Title: "Information Provision System, Server, Terminal Device, Information Provision Method, Display Control Method and Recording Medium", filed Dec. 19, 2012.

* cited by examiner

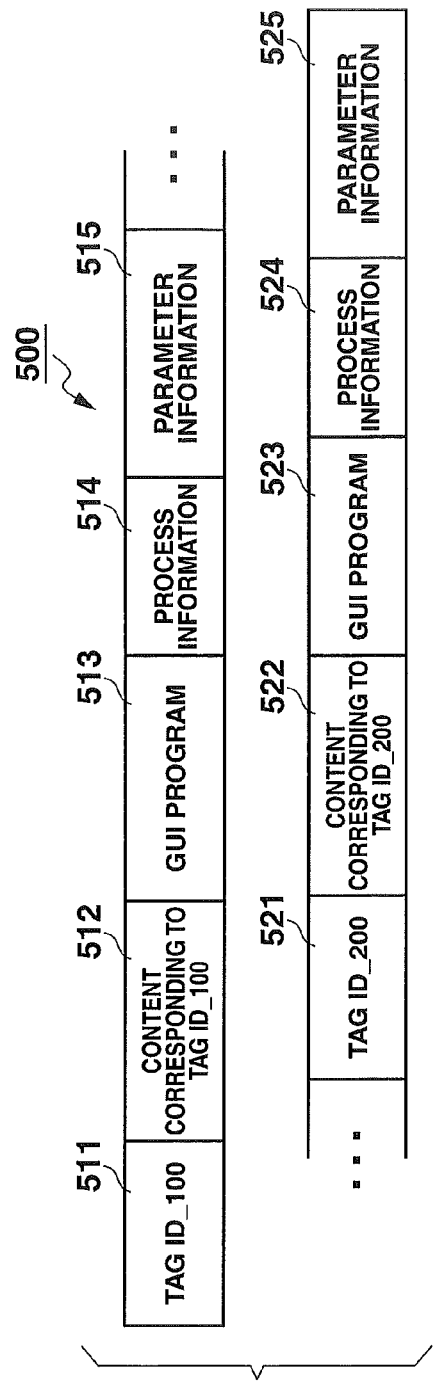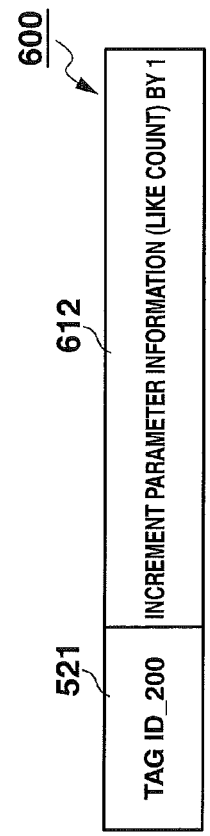

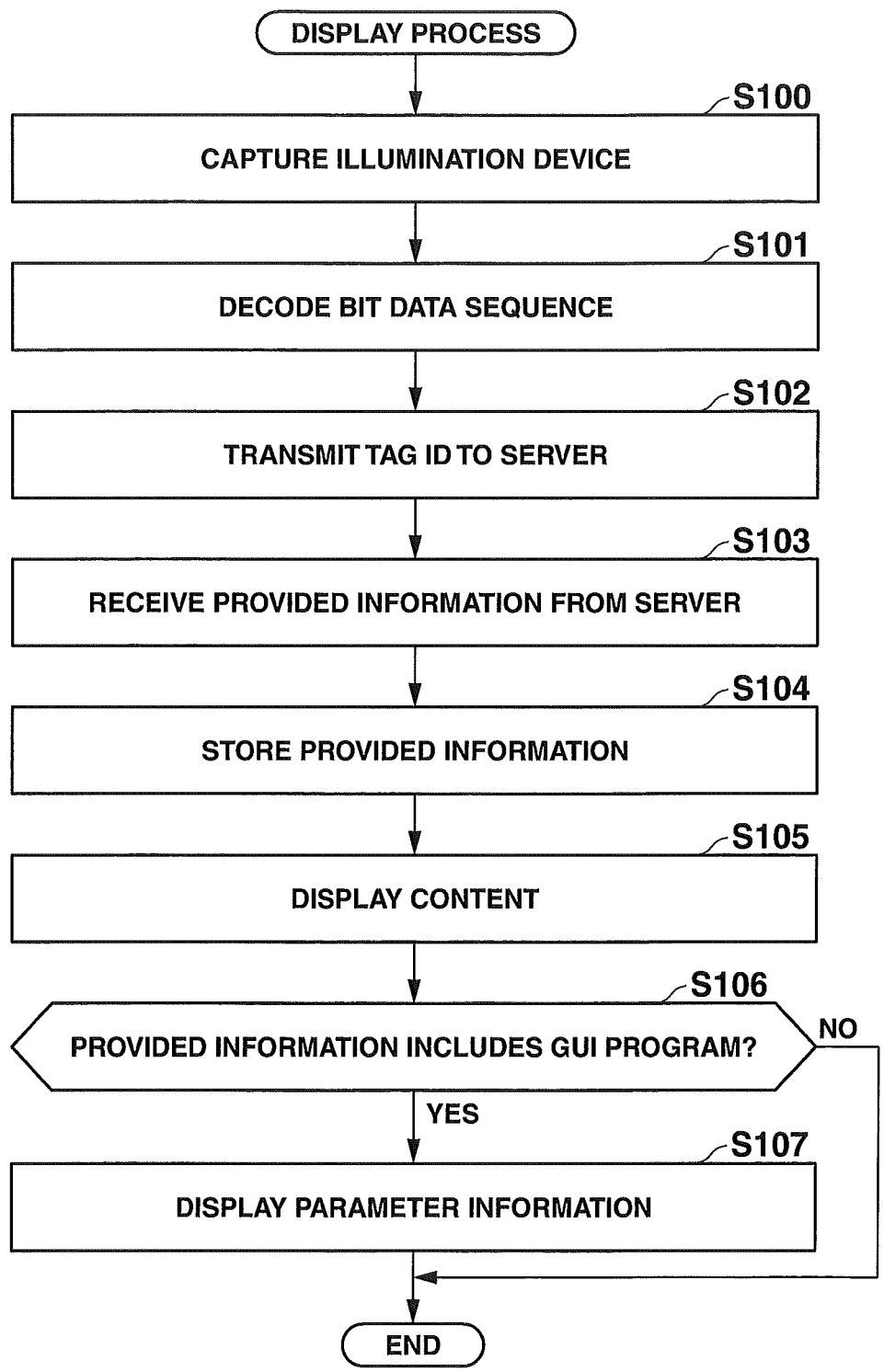

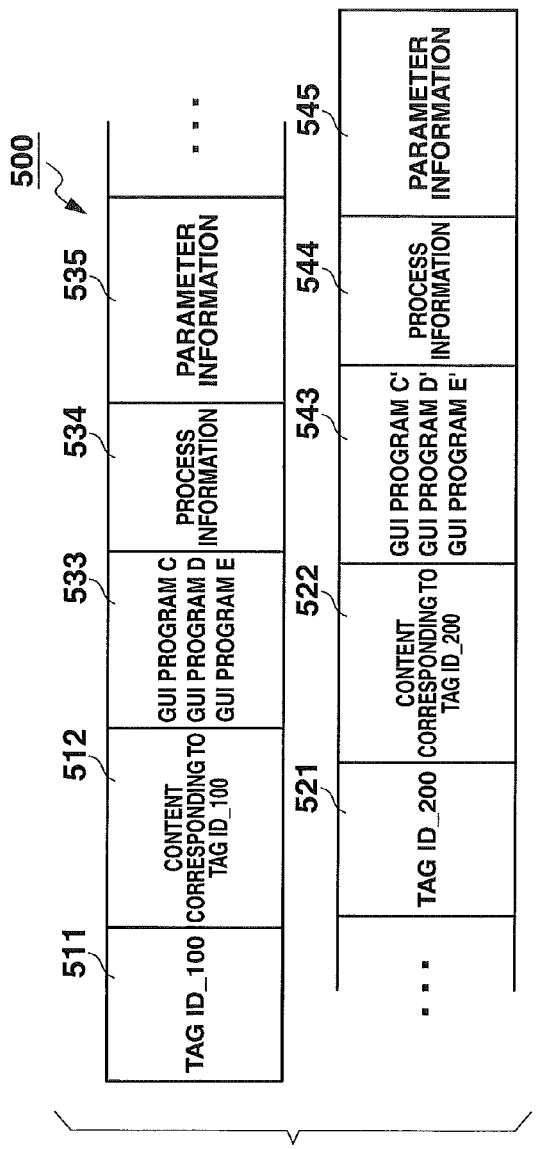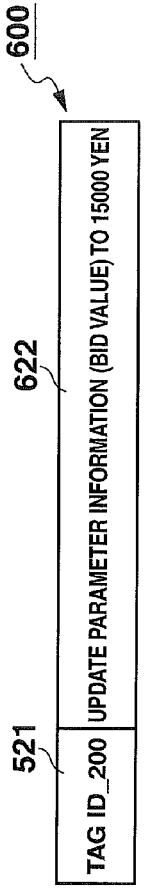

FIG.16A

| 551 | 552 | 553 | 554 | 555 | 556 |
|---|---|---|---|---|---|
| TAG ID_300 | CONTENT CORRESPONDING TO TAG ID_300 | GUI PROGRAM | PROCESS INFORMATION | PARAMETER INFORMATION | OPTIONAL INFORMATION |

| 561 | 562 | 563 | 564 | 565 | 566 |
|---|---|---|---|---|---|
| TAG ID_400 | CONTENT CORRESPONDING TO TAG ID_400 | GUI PROGRAM | PROCESS INFORMATION | PARAMETER INFORMATION | OPTIONAL INFORMATION |

| 571 | 572 | 573 | 574 | 575 | 576 |
|---|---|---|---|---|---|
| TAG ID_500 | CONTENT CORRESPONDING TO TAG ID_500 | GUI PROGRAM | PROCESS INFORMATION | PARAMETER INFORMATION | OPTIONAL INFORMATION |

(1) FOR OTHER TAG IDS CONSTITUTING ID GROUP LIST, ACQUIRE NUMBER GENERATED BY RESPONSE INFORMATION THAT INCLUDES THE TAG ID
(2) ADD 1 TO ACQUIRED NUMBER. ACQUIRE NUMBER OF TAG IDS CONSTITUTING ID GROUP LIST. GENERATE UPLOAD INFORMATION COMBINING NUMBER OBTAINED BY ADDING 1 TO ACQUIRED NUMBER, AND NUMBER OF TAG IDS CONSTITUTING ID GROUP LIST. GENERATE RESPONSE INFORMATION MADE UP OF TAG ID INPUT FROM GUI AND UPLOAD INFORMATION
(3) IN THE CASE WHERE RESPONSE INFORMATION HAS BEEN GENERATED FOR ALL TAG IDS CONSTITUTING THE ID GROUP LIST, UPLOAD RESPONSE INFORMATION CORRESPONDING TO ALL TAG IDS TO SERVER 300

| 551 | 632 |
|---|---|
| TAG ID_300 | RANK 1/3 |

| 561 | 642 |
|---|---|
| TAG ID_400 | RANK 3/3 |

| 571 | 652 |
|---|---|
| TAG ID_500 | RANK 2/3 |

INFORMATION PROCESSING SYSTEM, INFORMATION PROCESSING METHOD, CLIENT DEVICE, AND RECORDING MEDIUM

CROSS-REFERENCE TO RELATED APPLICATION

This application claims the benefit of Japanese Patent Application No. 2012-208904, filed on Sep. 21, 2012, the entire disclosure of which is incorporated by reference herein.

FIELD

This application relates to an information processing system, an information processing method, a client device, and a recording medium.

BACKGROUND

In the related art, there exists a system that presents, on a screen of a client device, information such as media content captured by continuously capturing an optical signal transmitted by visible light communication.

For example, Japanese Patent Application No. 2011-286846, also filed by the applicant of the present application, discloses an information providing system made up of a transmitting device, a client device, and a server. In this information providing system, the transmitting device modulates identification information that identifies content, and transmits the modulated information using light as a communication medium. The client device receives the modulated information by capturing the transmitting device, and acquires the identification information by conducting a decoding process. The client device transmits the identification acquired from the transmitting device to the server, receives content identified by the identification information from the server, and displays the received content on a display screen. Thus, the information providing system disclosed in Japanese Patent Application No. 2011-286846 provides a user with a function of viewing information with a simple operation.

SUMMARY

The present invention takes as an object to provide an information processing system, an information processing method, a client device, and a recording medium able to easily receive information using light as a communication medium, and in addition, easily check for updates or the like.

In order to achieve the above object, an information processing system according to a first aspect of the present invention includes a server provided with memory that associates and stores identification information and content, a transmitting device that transmits the identification information, using light that varies over time as a communication medium, and a client device. The client device includes a photosensor, a photosensor controller that controls the photosensor to continuously sense the light, a decoder that decodes the light varying over time and continuously sensed by the photosensor controller into the identification information, a transmitter, a first transmission controller that controls the transmitter to transmit identification information decoded by the decoder to the server, a receiver that receives content transmitted from the server in response to the transmission of identification information by the first transmission controller, an output device that outputs content received by the receiver, a detector that detects an external operation on the content output by the output device, and a second transmission controller that controls the transmitter to transmit detection details from the detector to the server. The server additionally includes a memory controller that controls the memory to update the content on the basis of detection details transmitted by the second transmission controller.

In order to achieve the above object, an information processing method according to a second aspect of the present invention is an information processing method for a system that includes a server provided with memory that associates and stores identification information and content, a transmitting device that transmits the identification information, using light that varies over time as a communication medium, and a client device provided with a photosensor, a communication device, and an output device. The method involves the client device conducting a photosensing step that causes the photosensor to continuously sense the light, a decoding step that decodes the light varying over time and continuously sensed in the photosensing step into the identification information, a first transmitting step that transmits identification information decoded in the decoding step from the communication device to the server, a receiving step that receives, at the communication device, content transmitted from the server in response to the transmission of identification information in the first transmitting step, an outputting step that causes the output device to output content received in the receiving step, a detecting step that detects an external operation on the content output in the outputting step, and a second transmitting step that transmits detection details in the detecting step from the communication device to the server. The server additionally controls the memory to update the content on the basis of detection details transmitted in the second transmitting step.

In order to achieve the above object, a client device according to a third aspect of the present invention includes a photosensor, a photosensor controller that controls the photosensor to continuously sense light varying over time, a decoder that decodes the light varying over time and continuously sensed by the photosensor controller into identification information, a transmitter, a first transmission controller that controls the transmitter to transmit identification information decoded by the decoder to an external server, a receiver that receives content transmitted from the server in response to the transmission of identification information by the first transmission controller, an output device that outputs content received by the receiver, a detector that detects an external operation on the content output by the output device, and a second transmission controller that controls the transmitter to transmit detection details from the detector to the server.

In order to achieve the above object, an information processing method according to a fourth aspect of the present invention is an information processing method for a client device provided with a photosensor, a communication device, and an output device, the information processing method including a photosensing step that causes the photosensor to continuously sense light varying over time, a decoding step that decodes the light varying over time and continuously sensed in the photosensing step into identification information, a first transmitting step that transmits identification information decoded in the decoding step from the communication device to an external server, a receiving step that receives, at the communication device, content transmitted from the server in response to the transmission of identification information in the first transmitting step, an outputting step that causes the output device to output content received in the receiving step, a detecting step that detects an external operation on the content output in the outputting step, and a second transmitting step that transmits detection details in the detecting step from the communication device to the server.

In order to achieve the above object, a recording medium according to a fifth aspect of the present invention is a recording medium storing a computer-readable program for a client device provided with a photosensor, a communication device, and an output device, the program causing the client device to function as a photosensor controller that causes the photosensor to continuously sense light varying over time, a decoder that decodes the light varying over time and continuously sensed by the photosensor controller into identification information, a first transmitter that transmits identification information decoded by the decoder from the communication device to an external server, a receiver that receives, at the communication device, content transmitted from the server in response to the transmission of identification information by the first transmitter, an output controller that causes the output device to output content received by the receiver, a detector that detects an external operation on the content output by the output controller, and a second transmitter that transmits detection details by the detector from the communication device to the server.

BRIEF DESCRIPTION OF THE DRAWINGS

A more complete understanding of this application can be obtained when the following detailed description is considered in conjunction with the following drawings, in which:

FIG. 6A is a diagram illustrating an example of provided information according to the first embodiment;

FIG. 6B is a diagram illustrating an example of response information according to the first embodiment;

FIG. 7 is a flowchart of a display process according to the first embodiment;

FIG. 13A is a diagram illustrating an example of provided information according to the second embodiment;

FIG. 13B is a diagram illustrating an example of process information according to the second embodiment;

FIG. 13C is a diagram illustrating an example of response information according to the second embodiment;

FIG. 16A is a diagram illustrating an example of provided information according to the third embodiment;

FIG. 16B is a diagram illustrating an example of process information according to the third embodiment;

FIG. 16C is a diagram illustrating an example of response information according to the third embodiment;

DETAILED DESCRIPTION

Hereinafter, an information processing system according to an embodiment of the present invention will be described.

First Embodiment

An information processing system 10 according to the present embodiment includes a client device 100, an illumination device (transmitting device) 200, a server 300, an access point 400, and a network system NW.

Figure 1:
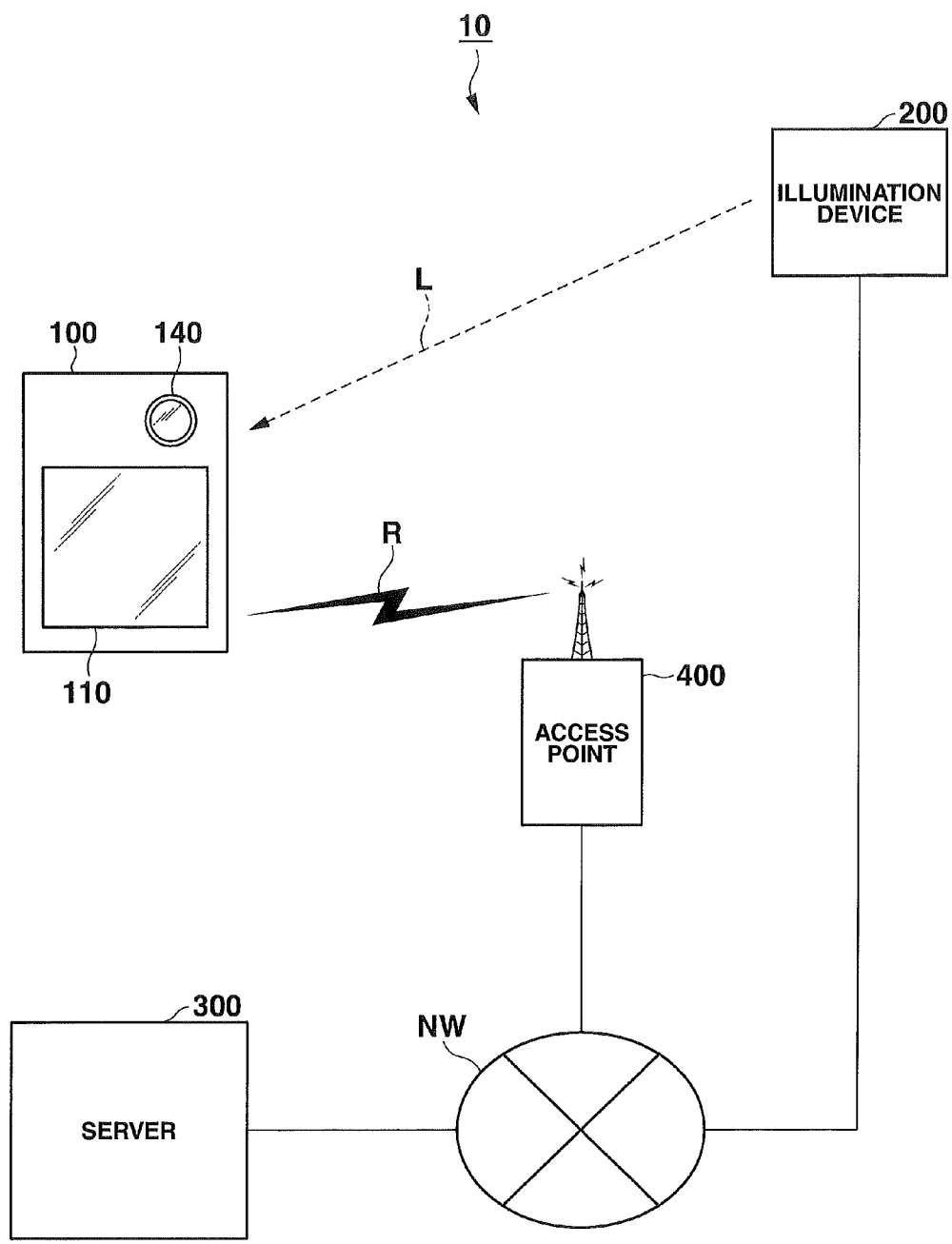
FIG. 1 is a diagram illustrating a configuration of an information processing system according to an embodiment of the present invention.

One or more illumination devices 200 are provided (FIG. 1 illustrates only one). Each illumination device 200 converts a tag ID (identification information) of content provided by the server 300 into an optical signal L that modulates in brightness (blinks) or changes in color, and outputs the optical signal L into the surroundings. The client device 100 optically senses the optical signal L containing the tag ID from the illumination device 200 by capturing the illumination device 200 included in an image capture range with an image capture device 140. The client device 100 then transmits the tag ID obtained by optical sensing to the server 300 by wireless communication via a nearby access point 400 and the network system NW, and receives (downloads) provided information 500 (discussed later) from the server 300. The provided information 500 includes content corresponding to the tag ID, and the client device 100 displays the acquired content on a display screen. Additionally, the provided information 500 includes a graphical user interface (GUI) program enabling the user to input instructions. The client device 100 presents content on the display screen on the basis of the program, and provides the user with a function for updating information related to the content (for example, a count for a "Like" button used in a social networking service (SNS)).

Figure 2:
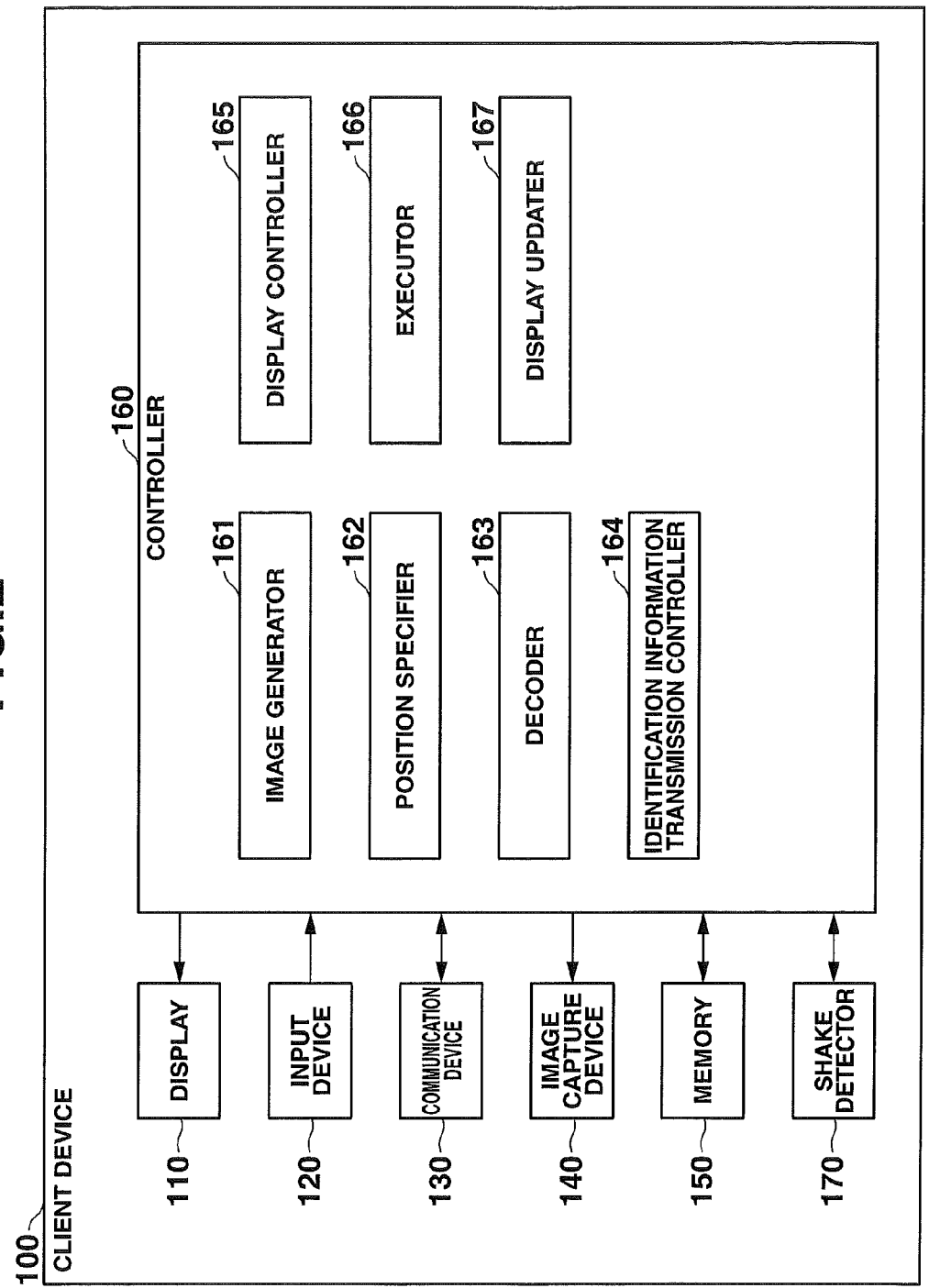
FIG. 2 is a diagram illustrating a configuration of the client device illustrated in FIG. 1.

The client device 100 functions as a client device for transmitting and receiving information to and from the illumination device 200 and the server 300. As illustrated in FIG. 2, the client device 100 includes a display 110, an input device 120, a communication device 130, an image capture device 140, memory 150, a controller 160, and a shake detector 170.

The display 110 functions as an output device, and is realized by a display such as a liquid crystal display (LCD), a plasma display panel (PDP), or an electroluminescence (EL) display, for example. The display 110 displays an image (for example, a live-view image) in accordance with an image signal output by the controller 160.

The input device 120 is equipped with a touch sensor (touch panel) that detects touched positions, and is disposed so as to cover the display 110 on the front face of the case of the client device 100, thereby constituting a touch-sensitive touchscreen in combination with the display 110.

The communication device 130 is configured to use circuits such as a radio frequency (RF) circuit and a baseband (BB) circuit, for example. The communication device 130 transmits and receives radio signals R to and from a nearby access point (wireless router) 400 via an antenna. In addition, the communication device 130 encodes and modulates transmit signals, and demodulates and decodes receive signals.

The image capture device 140 includes a lens and a photosensor. The lens is a zoom lens or the like, and moves according to zoom control operations from the input device 120, as well as focus control by the controller 160. The imaging angle of view of the image capture device 140 and the optical image are controlled by the movement of the lens. The photosensor is made up of multiple photosensors regularly arranged in a two-dimensional array on a light-sensing surface. The photosensor is an imaging device such as a charge-coupled device (CCD) or complementary metal-oxide-semiconductor (CMOS), for example. The photosensor captures (senses) an optical image incident via the lens with an imaging angle of view of given range according to control by the controller 160.

The memory 150 is random access memory (RAM) used as a work area and read-only memory (ROM) that stores basic operating programs, for example. The memory 150 stores various information (programs, for example) used for control and the like of the client device 100.

The controller 160 is equipped with a central processing unit (CPU), and executes software processing according to programs stored in the memory 150. In order to realize the various functions provided in the client device 100, the controller 160 functions as an image generator 161, a position specifier 162, a decoder 163, an identification information transmission controller 164, a display controller 165, an executor 166, and a display updater 167.

The image generator 161 generates a frame by converting an image signal within the imaging angle of view output by the image capture 140 into digital data. Additionally, the image generator 161 generates consecutive frames in time, and successively stores the generated frames in the memory 150.

Also, if a control signal based on a record operation performed via the input device 120 is input, the image generator 161 encodes the optical image within the imaging angle of view in the image capture device 140, or alternatively, the optical image within a display range displayed on the display 110, according to a compression/coding format such as the Joint Photographic Experts Group (JPEG) format, for example.

The position specifier 162 acquires the luminance at the same coordinates for a given number of frames. In the case where the luminance at particular coordinates changes greatly, such as by being equal to or greater than a first given value (a first threshold) in one frame, and less than or equal to a second given value (a second threshold) in another frame (herein, the first threshold is greater than the second threshold), the position specifier 162 specifies those coordinates (that position) as being the coordinates at which blinking light output from the illumination device 200 is sensed (hereinafter designated the "luminance point coordinates").

The position specifier 162 also converts the luminance at the luminance point coordinates into bit data. For example, the luminance is converted to "1" if equal to or greater than the first given value, and to "0" if less than or equal to the second given value. Note that "1" indicates that the illumination device 200 is switched on (light-on, light-up), while "0" indicates that the illumination device 200 is switched off (light-off). The position specifier 162 conducts this conversion for a given number of frames that are consecutive in time, and stores bit data that is consecutive in time in the memory 150 as a bit data sequence indicating the luminance at the luminance point coordinates.

The decoder 163 decodes the bit data sequence of the luminance at the luminance point coordinates into digital data (a tag ID). For the decoding scheme, a scheme that corresponds to the encoding scheme used by a later-discussed encoder/modulator 240 inside the illumination device 200 is implemented.

The identification information transmission controller 164 controls the communication device 130 to transmit the tag ID decoded by the decoder 163 to the server 300.

Figures 5A, 5B:
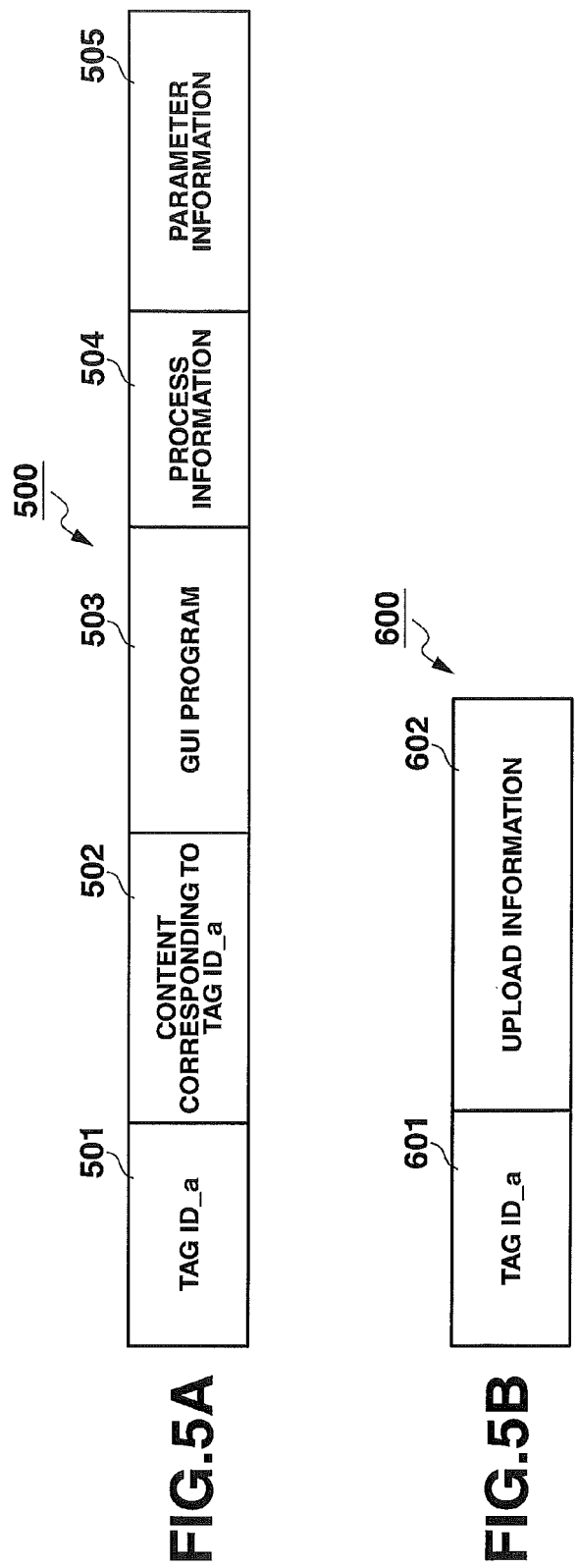
FIG. 5A is a diagram illustrating the structure of provided information according to the first embodiment.
FIG. 5B is a diagram illustrating the structure of response information according to the first embodiment.

The display controller 165 controls the display 110 to adjust the image quality and image size of frames, and display adjusted frames on a display screen as live-view images (through-the-lens images). Also, the display controller 165 controls the display 110 to display provided information 500 downloaded from the server 300 overlaid onto a live-view image. As illustrated in FIG. 5A, the provided information 500 includes a tag ID (identification information) 501, content 502, a GUI program 503, process information 504, and parameter information 505. The tag ID 501 is information that uniquely identifies content. The content 502 is information such as text, photos, or video viewed by a user. The GUI program 503 is a program that interacts with the functions assumed by the input device 120, and particularly the display controller 165 and the display updater 167 of the controller 160, and is used to present content on a display screen and provide a user with a function for inputting particular instructions. The process information 504 is information indicating a process executed by the controller 160 in response to user instructions input with respect to the content. The parameter information 505 is information indicating a given parameter associated with the content (for example, a count for a "Like" button (a function icon that means "Like")). Furthermore, in the case where the parameter information 505 is updated at the server 300 while parameter information 505 is being displayed on the display 110, and the updated parameter information is provided, the display controller 165 controls the display 110 to replace the parameter information 505 being displayed with the updated parameter information 505.

The executor 166 controls the respective components constituting the client device 100 to execute a process indicated by the process information.

The display updater 167 controls the communication device 130 to transmit information generated by the process executed by the executor 166 (response information 600) to the server 300. As illustrated in FIG. 5B, the response information 600 includes a tag ID 601 and upload information 602. The upload information 602 includes information such as information instructing the server 300 to update the parameter information 505, the IP address and MAC address of the client device 100, and a user account, for example.

The shake detector 170 illustrated in FIG. 2 detects shaking of the client device 100, and includes a motion sensor, for example. The motion sensor is a two-dimensional or three-dimensional acceleration sensor. Using the touch sensor constituting the input device 120 as the shake detector 170 is also possible. In the case of detecting shaking, the shake detector 170 outputs a shake detection signal to the controller 160. The controller 160 executes a given shake correction process in response to the shake detection signal.

Figure 3:
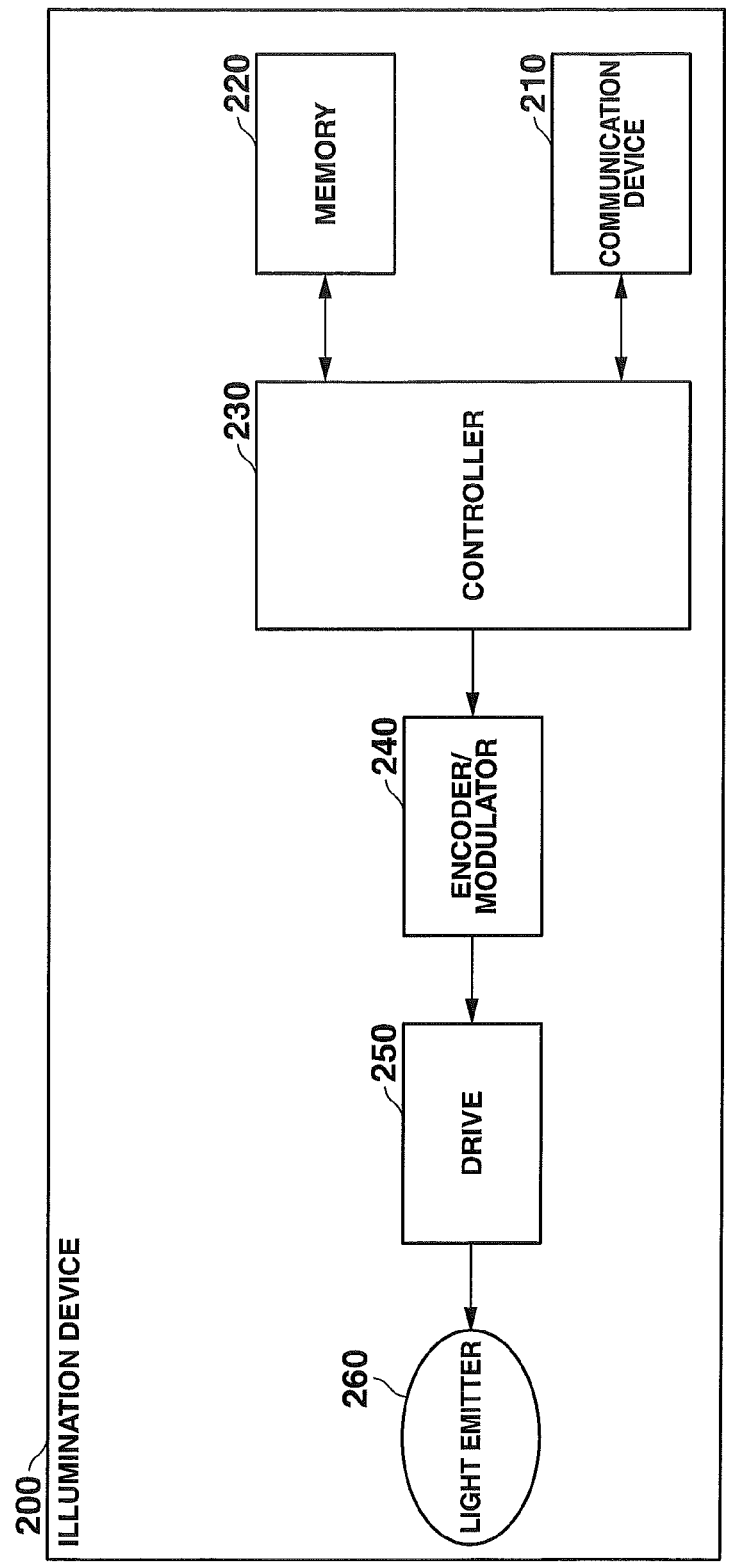
FIG. 3 is a diagram illustrating a configuration of the illumination device illustrated in FIG. 1.

Next, a configuration of the illumination device 200 illustrated in FIG. 1 will be described. As illustrated in FIG. 3, the illumination device 200 functions as a transmitting device that transmits a tag ID using light as a communication medium, and includes a communication device 210, memory 220, a controller 230, an encoder/modulator 240, a drive 250, and a light emitter 260.

The communication device 210 is a local area network (LAN) card, for example. The communication device 210 conducts communication with the illumination device 200 and the server 300 via the network system NW.

The memory 220 is RAM used as a work area and ROM that stores basic operating programs, for example. The memory 220 stores various information (programs, for example) used for control and the like of the illumination device 200.

The controller 230 is equipped with a CPU, executes software processing according to programs stored in the memory 220, and functions in order to realize various functions provided in the illumination device 200.

The encoder/modulator 240 encodes data output from the controller 230 into a bit data sequence. Additionally, the encoder/modulator 240 performs digital modulation based on the bit data sequence. Although the encoding scheme and the modulation scheme are arbitrary, 4-PPM (Pulse Position Modulation) using a carrier wave at a frequency of 28.8 kHz is preferably implemented as the modulation scheme.

The drive 250 generates a drive signal for varying the luminance of the light emitted by the light emitter 260 over time, in correspondence with the signal output from the encoder/modulator 240. The drive signal is a signal that instructs the light emitter 260 to raise the luminance to be equal to or greater than a first given value at timings when a pulse corresponding to the bit value "1" exists, and to lower the luminance to be less than or equal to a second given value (where the second given value is less than the first given value) at timings when a pulse corresponding to the bit value "0" does not exist.

The light emitter 260 is a light-emitting diode (LED), for example. The light emitter 260 emits light whose luminance varies over time between being equal to or greater than a first given value, and less than or equal to a second given value, according to the drive signal output from the drive 250.

Figure 4:
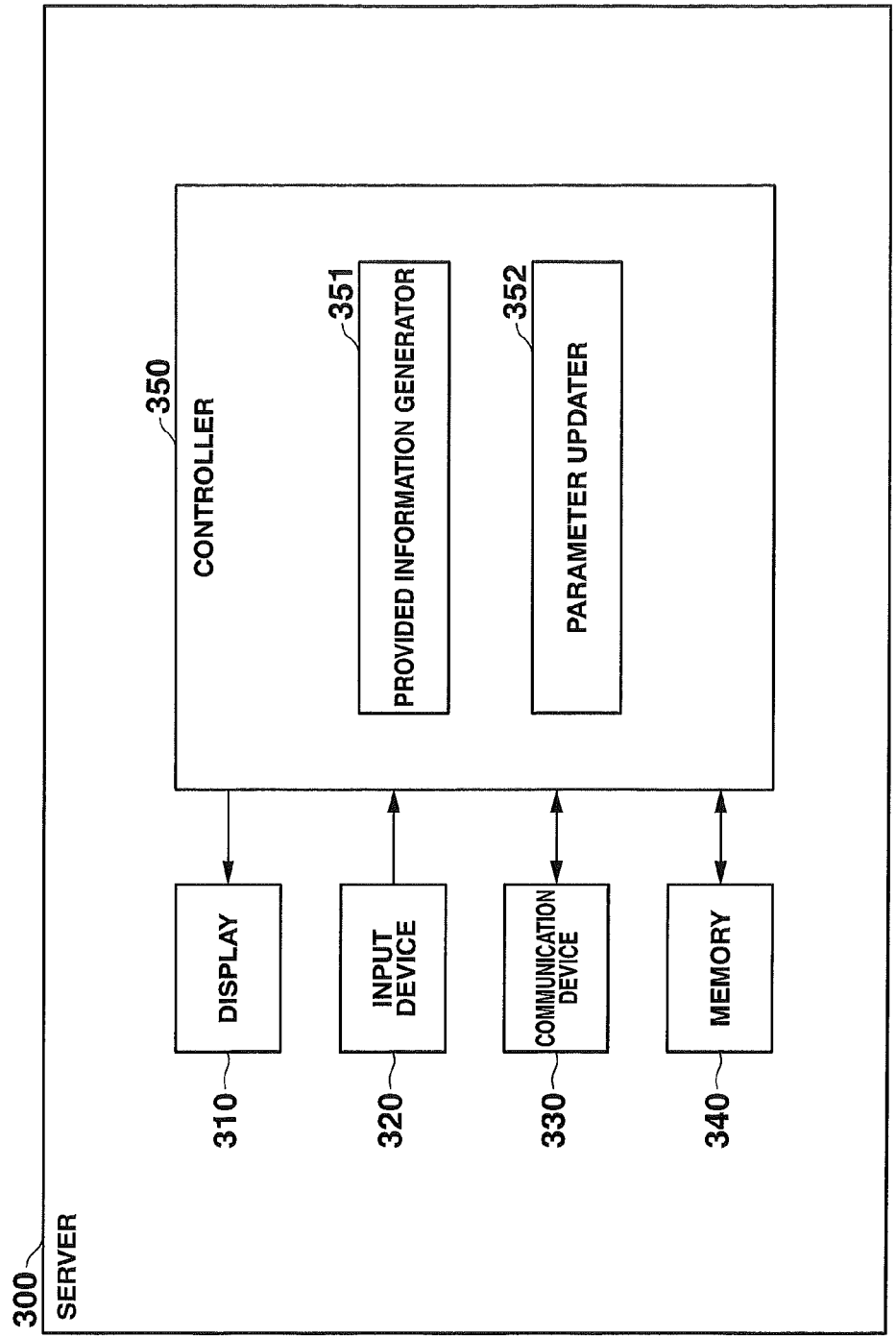
FIG. 4 is a diagram illustrating a configuration of the server illustrated in FIG. 1.

Next, a configuration of the server 300 illustrated in FIG. 1 will be described. As illustrated in FIG. 4, the server 300 functions as a management device that manages parameter information shared among respective users, and includes a display 310, an input device 320, a communication device 330, memory 340, and a controller 350.

The display 310 is realized by a display such as an LCD, PDP, or EL display, for example.

The input device 320 includes devices such as a keypad and function keys, and is an interface used to input user operations.

The communication device 330 is a local area network (LAN) card, for example. The communication device 310 communication with the client device 100 and the illumination device 200 via the network system NW.

The memory 340 is RAM used as a work area and ROM that stores basic operating programs, for example. The memory 340 stores various information (programs, for example) used for control and the like of the server 300. The memory 340 also stores content, GUI programs, process information, and parameter information in association with tag IDs. Note that the information associated with tag IDs may also be content only.

The controller 350 is equipped with a CPU, executes software processing according to programs stored in the memory 340, and functions as a provided information generator 351 and a parameter updater 352 in order to realize various functions provided in the server 300.

The provided information generator 351 generates the provided information 500 illustrated in FIG. 5A according to given instructions input by a user via an input device.

The parameter updater 352 updates the parameter information 505 on the basis of the information instructing the server 300 to update the parameter information 505 that is included in the response information 510. The response information 510 is transmitted from each client device 100.

The access point 400 illustrated in FIG. 1 includes a wireless router or the like, and mediates communication between the client device 100 and the server 300.

Next, operation of the information processing system 10 having the above configuration will be described.

The memory 340 of the server 300 provided in the information processing system 10 stores a large amount of content 502 that is provided by information providers. In addition, a tag ID 501 that identifies content are associated with each item of content 502. A delivery schedule that determines which illumination device 200 delivers the tag ID 501 of which content 502 at what times is also registered in the memory 340 of the server 300. On the basis of the delivery schedule stored in the memory 340, the controller 350 transmits such a tag ID 501 together with the delivery schedule to a corresponding illumination device 200 via the communication device 330 at an arbitrary timing. The controller 230 of the illumination device 200 receives the tag ID 501 and the delivery schedule transmitted from the server 300 via the communication device 210, and stores the received information in the memory 220.

The controller 230 of the illumination device 200 reads out a tag ID 501 from the memory 220 according to the delivery schedule, and outputs the read-out tag ID 501 to the encoder/modulator 240. The encoder/modulator 240 encodes the input tag ID 501 into a bit data sequence. Next, the encoder/modulator 240 digitally modulates a signal based on the bit data sequence, and outputs the modulated signal to the drive 250.

The drive 250 generates a drive signal on the basis of the input signal. A drive signal refers to a signal for varying the luminance of light emitted by the light emitter 260 over time. The drive 250 outputs the generated drive signal to the light emitter 260. The light emitter 260 outputs (emits) an optical signal (tag ID light) L, whose luminance varies over time on the basis of the input drive signal, into the space around the illumination device 200.

In the case where a user positioned in an environment able to receive the optical signal L output from the illumination device 200 wants to the acquire the information provided by the optical signal L, the image capture device 140 of the client device 100 continuously captures the illumination device 200, as illustrated in FIG. 7 (step S100). The image capture device outputs an image signal detected in this way by an image sensor to the image generator 161. The image generator 161 generates a frame by converting the input image signal into digital data. Also, the image generator 161 generates consecutive frames in time, and successively stores the generated frames in the memory 150. At given timings, the position specifier 162 acquires the luminance at the same coordinates for a given number of frames. In the case where the luminance at the same coordinates changes greatly, such as by being equal to or greater than a first given value in one frame, and less than or equal to a second given value in another frame, the position specifier 162 specifies those coordinates (that position) as being the "luminance point coordinates".

Next, the position specifier 162 converts the luminance at the luminance point coordinates for a given number of consecutive frames in time into bit data, and stores the converted bit data in the memory 150.

The decoder 163 decodes the bit data sequence of the luminance at the luminance point coordinates into tag IDs 511 and 521 (information in the same format as 501 above)

(step S101). The decoder 163 acquires a tag ID_100 (511) and a tag ID_200 (521) by decoding, and outputs the acquired tag IDs to the identification information transmission controller 164. When decoded information from the decoder 163 is input, the identification information transmission controller 164 determines whether or not the input information is in tag ID format. In the case of determining that the input information is in tag ID format, the identification information transmission controller 164 encodes and modulates the two tag IDs 511 and 521. Additionally, the identification information transmission controller 164 controls the communication device 130 to transmit the encoded and modulated information to the server 300 (step S102). In the case of determining that the input information is in a format different from a tag ID, the identification information transmission controller 164 controls the display 110 to display information indicating that the tag IDs could not be decoded.

At the server 300, when the tag IDs from the client device 100 (the tag ID_100 and the tag ID_200) are input into the provided information generator 351 via the communication device 330, the provided information generator 351 acquires content 512 and 522 identified by the tag IDs 511 and 521 (information in the same format as 501), GUI programs 513 and 523, process information 514 and 524, and parameter information 515 and 525 from the memory 340. Next, the provided information generator 351 generates provided information 500 including the acquired information. As illustrated in FIG. 6A, in the present embodiment, there is generated provided information 500 that includes the content 512 associated with the tag ID_100 (511), a GUI program 513, and process information 514, parameter information 515, as well as content 522 associated with the tag ID_200 (521), a GUI program 523, process information 524, parameter information 525.

Next, the provided information generator 351 outputs the generated provided information 500 to the controller 350. The controller 350 controls the communication device 330 to transmit the input provided information 500 to the client device 100 from which the identification information originated.

The client device 100 receives the provided information 500 via the communication device 130 (step S103). Next, the display controller 165 stores the received provided information 500 in the memory 150 (step S104). Next, the display controller 165 reads out the content (such as icon images) 512 and 522 associated with the tag ID_100 (511) and the tag ID_200 (521) from the provided information 500. In addition, the coordinates on the display screen where the tag ID light from which the tag IDs were extracted (the luminance point coordinates) are acquired from the memory 150. The display controller 165 then controls the display 110 to display the read-out content 512 and 522 at the display position of the luminance point coordinates specified by the corresponding tag IDs (step S105). The content 512 and 522 is displayed overlaid onto a live-view image currently being displayed.

Figure 8:
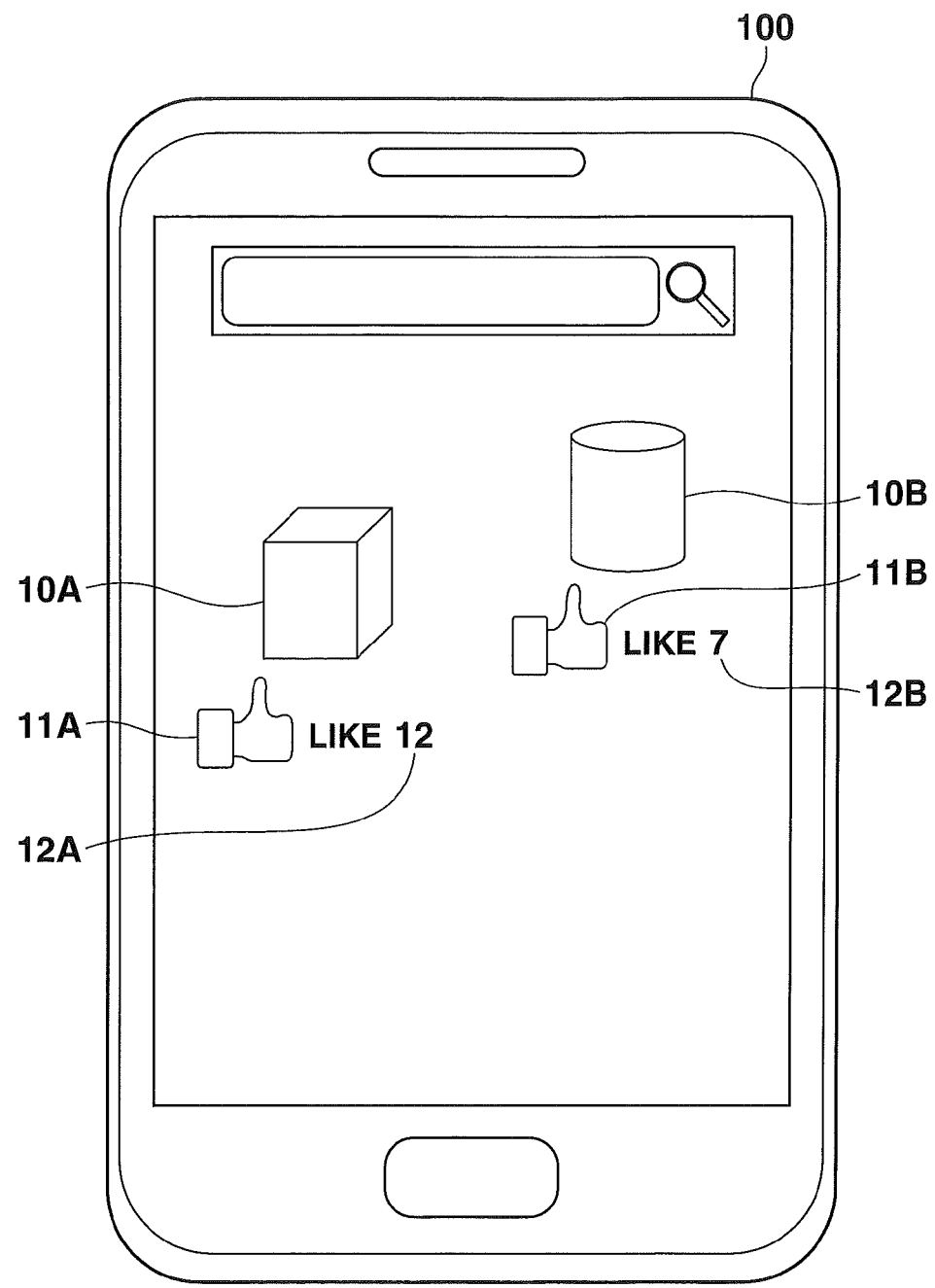
FIG. 8 is a diagram illustrating an exemplary display on a client device according to the first embodiment.

Also, the display controller 165 determines whether or not the provided information 500 includes the GUI programs 513 and 523 (step S106). In the case where the provided information 500 includes the GUI programs 513 and 523 (step S106; Yes), the display controller 165 controls the display 110 to present (display) content on a display screen, and display the parameter information 515 and 525, as illustrated in FIG. 8 (step S107). In FIG. 8, the content 11A (corresponding to 512) that corresponds to the tag ID_100 (511) is a combination of an icon illustrating a person's hand and the text "Like", and is displayed overlaid near an object 10A in the live-view image (at the position where luminance point coordinates exist). Also, the parameter information 12A (corresponding to 515) that corresponds to the tag ID_100 (511) is a number "12" indicating a count for the "Like" button, and is displayed on the right side of the content 11A. The content 11B (corresponding to 522) that corresponds to the tag ID_200 (521) is displayed overlaid near an object 10B in the live-view image (at the position where luminance point coordinates exist). Also, the parameter information 12B (corresponding to 525) that corresponds to the tag ID_200 is a number "7" indicating a count for the "Like" button, and is displayed on the right side of the content 11B. Meanwhile, the display controller 165 ends the display process in the case where the provided information 500 does not include the GUI programs 513 and 523 in step S106 (step S106; No).

Figure 9:
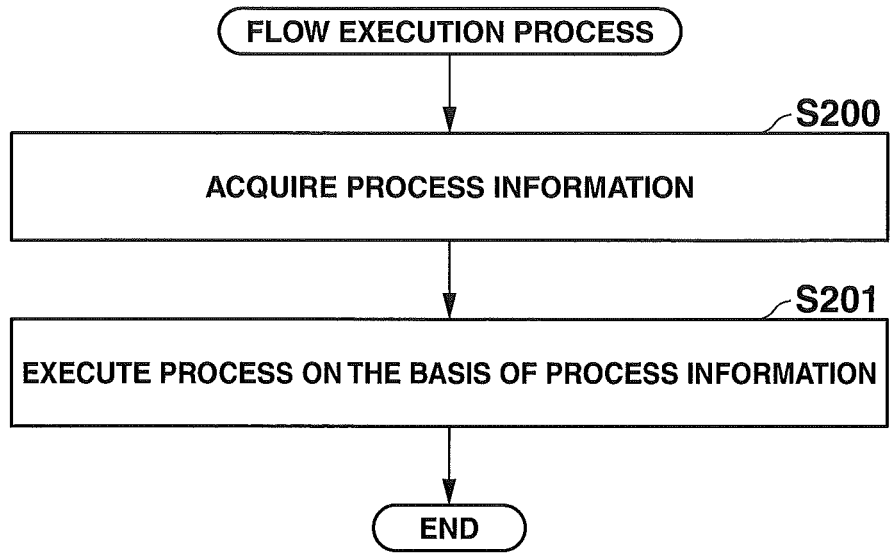
FIG. 9 is a flowchart of a flow execution process according to the first embodiment.

If a user operation touching the content 11B is detected as an instruction operation, given instructions and the tag ID_200 (521) corresponding to the instruction input source (the content 11B) is input into the executor 166. As a result of being input with this information, the executor 166 starts the flow execution process illustrated in FIG. 9. The executor 166 acquires the process information 524 corresponding to the input tag ID_200 (521) from the provided information 500 (step S200), and executes a process based on the details indicated by the process information 524 (step S201). The given instructions (for example, instructions to increment the parameter information 12B by 1) are referenced (utilized) in part of the process executed by the executor 166.

For example, a process may be defined in the process information 524 corresponding to the tag ID_200 as follows: upon receiving instructions to increment the parameter information 12B (the Like count), generate instruction information to increment the parameter information 12B by 1, and transmit (upload) to the server 300 in association with the tag ID. On the basis of this process, the executor 166 generates instruction information 612 for incrementing the parameter information 12B (the Like count) by 1. The executor 166 then associates the tag ID_200 (521) and the generated instruction information (upload information) 612, and transmits the information to the server 300 as the response information 600 illustrated in FIG. 6B.

Figure 10:
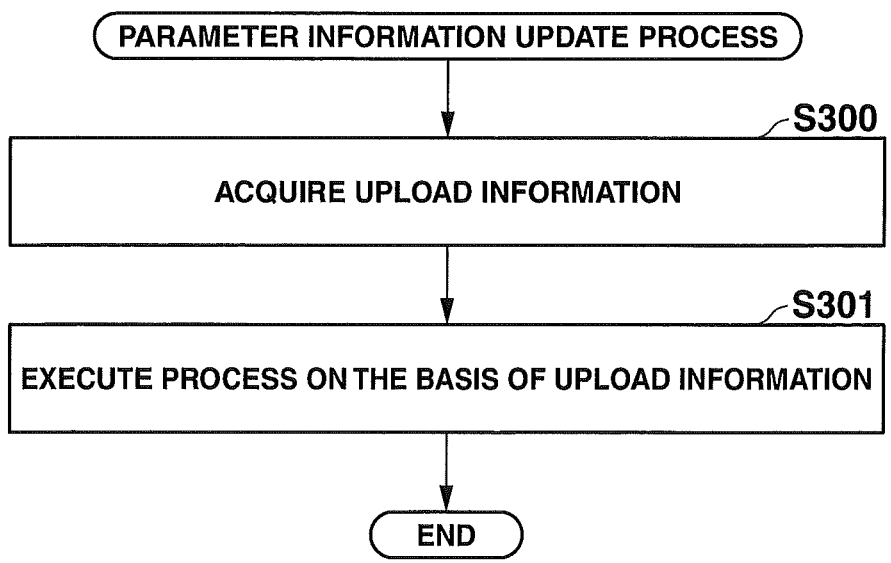
FIG. 10 is a flowchart of a parameter information update process according to the first embodiment.

At the server 300, when the response information 600 received from the client device 100 via the communication device 330 is input into the parameter updater 352, the parameter updater 352 starts the parameter information update process illustrated in FIG. 10. The parameter updater 352 acquires the upload information 612 from the response information 600 (step S300). On the basis of the acquired upload information 612, the parameter updater 352 updates the parameter information 12B (corresponding to 525) that corresponds to the tag ID_200 (521) (step S301). For example, in the case where the upload information 612 includes instructions to increment the parameter information 12B (the Like count) by 1, the parameter updater 352 increments the parameter information 12B corresponding to the tag ID_200 (521) by 1 on the basis of the instructions. Since the parameter information 12B (the Like count) before updating is "7", the updated parameter information 12B (the Like count) is "8".

Figure 11:
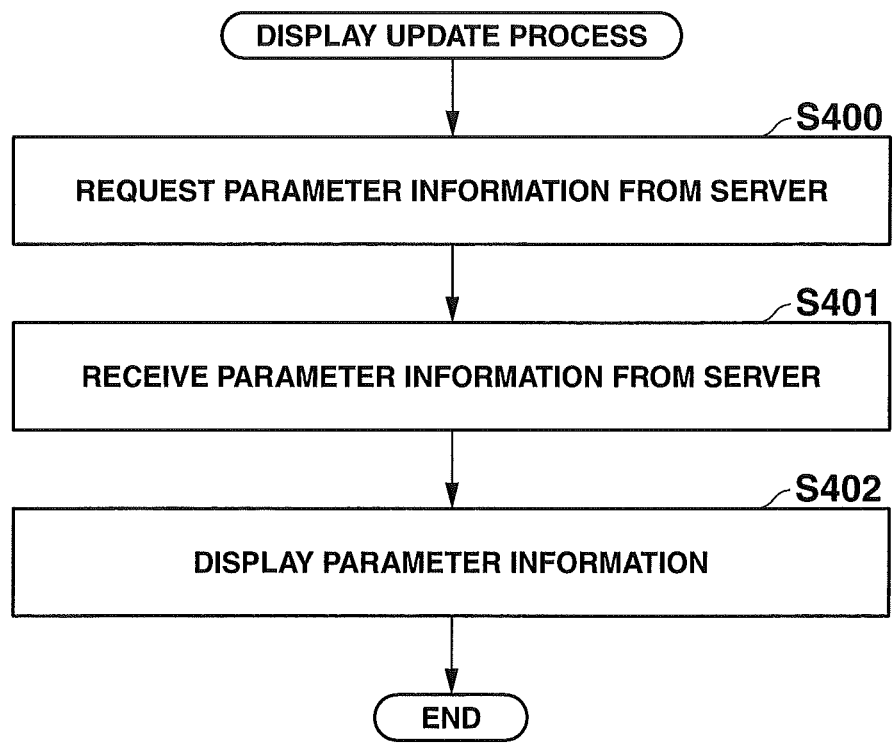
FIG. 11 is a flowchart of a display update process according to the first embodiment.
Figure 12:
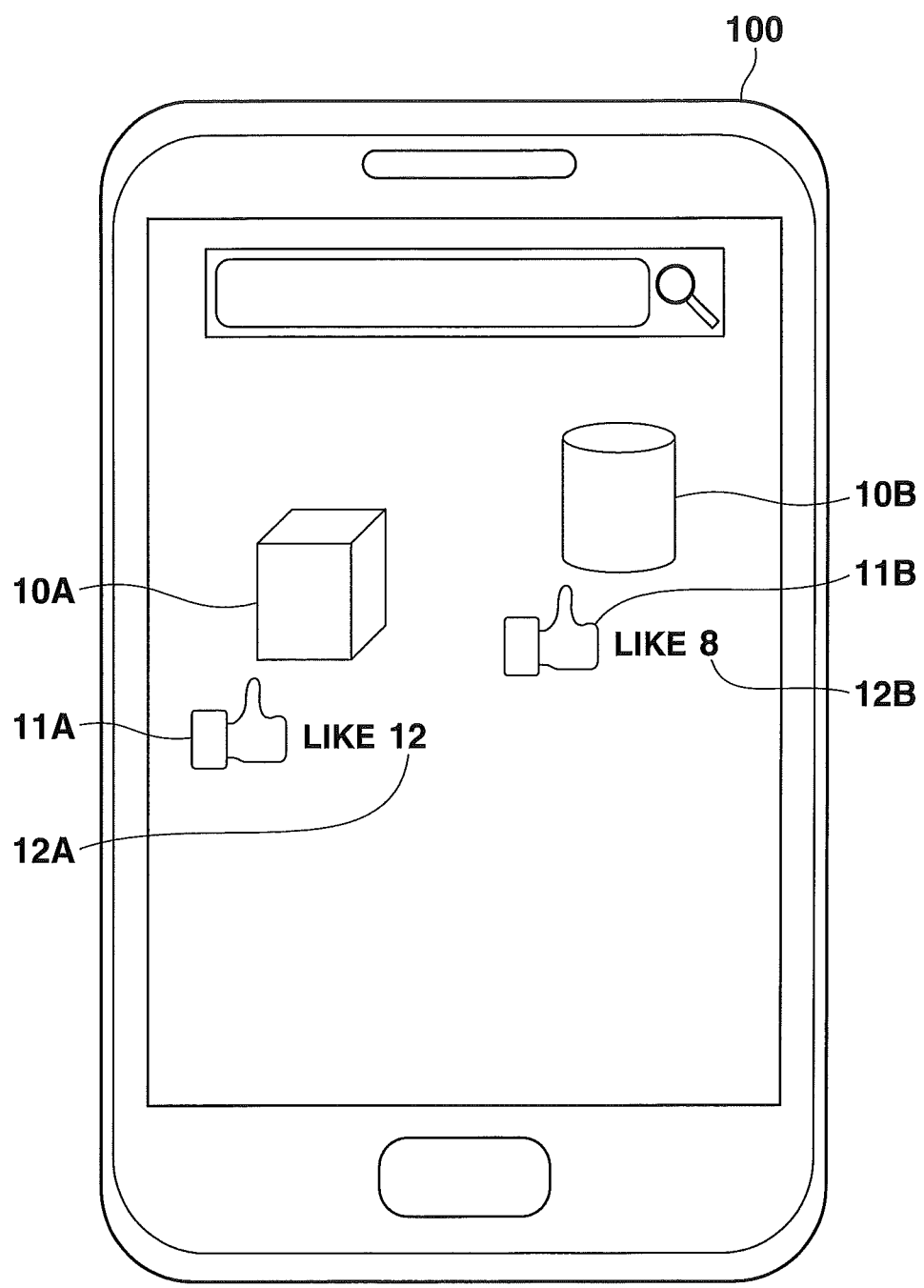
FIG. 12 is a diagram illustrating an exemplary updated display on a client device according to the first embodiment.

The display updater 167 starts the display update process illustrated in FIG. 11 at arbitrary timings. When the process starts, the display updater 167 controls the communication device 130 to transmit information requesting the transmission of the most recent value of the parameter information 12B currently being displayed (parameter transmission request information) to the server 300. When the most recent parameter information 12B is input into the display updater 167 from the server 300 in response to this transmission, the display updater 167 replaces the parameter information 12B being displayed with the most recent parameter information 12B. In other words, the value "7" of the parameter information 12B (the Like count) is updated to the most recent parameter information "8", as illustrated in FIG. 12.

Note that if instructions (end instruction information) to end display of (hide) the content 11A (corresponding to 512), the content 11B (corresponding to 522), the parameter information 12A (corresponding to 515) and the parameter information 12B (corresponding to 525) is input into the display updater 167 from the input device 120, the display updater 167 does not transmit information requesting the most recent parameter information 12A and parameter information 12B to the server 300 until the content 11A and the content 11B are once again displayed.

In addition, the client device 100 or another client device 100 is able to download (receive) the most recent parameter information 12A and parameter information 12B by capturing the illumination device 200, irrespective of whether or not the parameter information 12A and parameter information 12B are currently being displayed.

As described above, according to an information processing system 10 in accordance with the present embodiment, provided information 500 includes information such as a GUI program 503 (513, 523). A client device 100 displays content 504 (514, 524) by executing the GUI program 503 (513, 523) included in downloaded provided information 500, and also generates and transmits response information 600 to a server 300 in response to detecting an instruction operation on the content 504 (514, 524). Furthermore, the client device 100 receives updated parameter information 505 (515, 525) on the basis of the response information 600 from the server 300, and updates the parameter information 505 (515, 525) being displayed. Consequently, bidirectional communication between a client device 100 and a server 300 becomes possible with a simple operation, even with an information providing system in which a tag ID is delivered by an optical signal L from an illumination device.

In addition, the client device 100 displays content at a particular position based on luminance point coordinates within an image frame generated by image capture. Consequently, corresponding relationships between illumination devices and content are clearly understandable.

Furthermore, providing an input device with a touch sensor enables the input of instructions for content by touch, thus making operations easier.

Second Embodiment

The first embodiment describes an example in which parameter information 12B (a Like count) is incremented by detecting an instruction operation performed on content 11B by a user. In this way, there is one GUI program corresponding to a tag ID in the case of a simple process of incrementing the parameter information 12B. However, executing complex processes with one GUI program is difficult. Accordingly, the present embodiment provides an information processing system 10 able to execute complex processes.

Hereinafter, a mechanism of providing an auction service to a user will be described as an example of such a system. As illustrated in FIG. 13A, in the present embodiment, multiple GUI programs 533 and 543 are associated with tag IDs 512 and 522. Herein, the GUI program C and the GUI program C' are programs for inputting instructions to increment parameter information 535 and 545. The GUI program D and the GUI program D' are programs for inputting instructions to decrement the parameter information 535 and 545. The GUI program E and the GUI program E' are programs for inputting instructions to transmit the parameter information 535 and 545 to the server 300.

Figure 14:
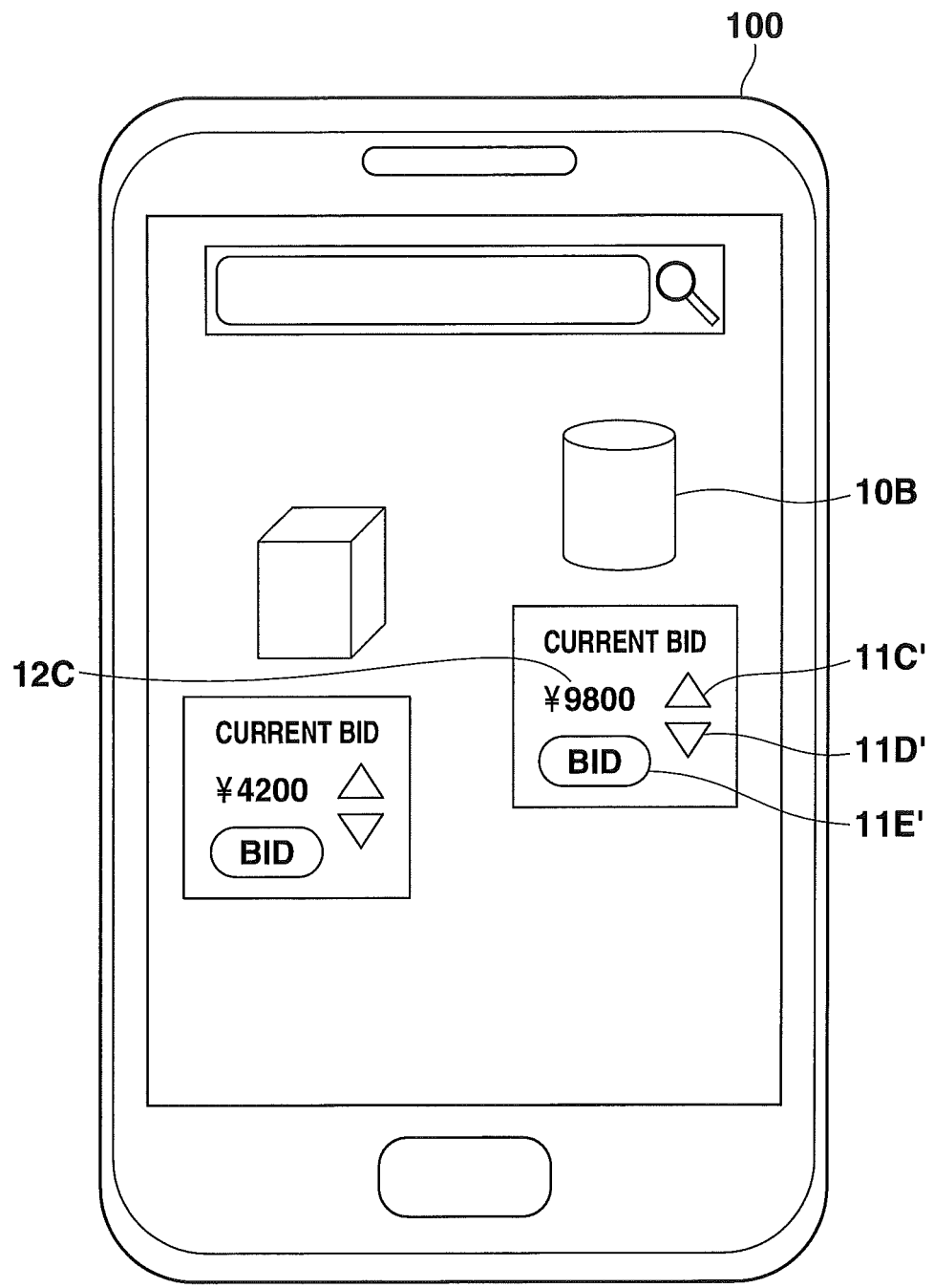
FIG. 14 is a diagram illustrating an exemplary display on a client device according to the second embodiment.

As illustrated in FIG. 14, in the client device 100, content 11C' corresponding to the GUI program C' is presented on a display screen. In addition, content 11D' corresponding to the GUI program D', and content 11E' corresponding to the GUI program E, are respectively presented on the display screen. The parameter information updated via the content 11C' to 11E' is parameter information 12C (a parameter corresponding to the parameter information 545 and expressed as a number, in this case "9800").

Also, as illustrated in FIG. 13B, process information 534 (544) includes processes executed according to instructions input from the content 11C' to 11E'. The process executed according to increment instructions (instructions with respect to the content 11C') is a process that adds (accumulates) 1000 to the parameter information 535 and 545 associated by tag IDs.

The process executed according to decrement instructions (instructions with respect to the content 11D') is a process that subtracts 1000 from (decreases) the parameter information 535 and 545 associated by tag IDs.

The process executed according to instructions to transmit parameter information to the server 300 (instructions with respect to the content 11E') is a process that generates instruction information (upload information) for updating the parameter information 535 and 545 on the server 300 with the specified parameter information 535 and 545.

Additionally, this process generates response information in which a tag ID and the generated instruction information are associated, and uploads (transmits) the information to the server 300.

Note that if the parameter information 12C stored in the memory 150 is updated, the executor 166 inputs information indicating the update into the display controller 165. In response to this input, the display controller 165 controls the display 110 to replace the parameter information 12C currently being displayed with the updated parameter information 12C.

Other aspects of the configuration are the same as the first embodiment.

Hereinafter, operation of the information processing system 10 according to the present embodiment will be described. If input specifying any of the content 11C' to 11E' illustrated in FIG. 14 is detected, the executor 166 starts the flow execution process illustrated in FIG. 15. When the process starts, the executor 166 acquires process information 534 and 544 included in provided information 500 (step S200), and from among the multiple processes indicated by the process information 534 and 544, executes a process according to the input instructions (S201). For example, in the case where the input instructions indicate incrementing a bid value (parameter information), the executor 166 executes the process of adding 1000 to the parameter information 12C corresponding to the tag ID_200. By this process, the parameter information 12C corresponding to the tag ID_200 is incremented from 9800 to 10800.

When the process according to the input instructions is completed, the executor 166 determines whether or not the parameter information 12C has been updated (step S202). The determination of whether or not the parameter information has been updated is conducted by comparing the parameter information 12C being displayed to the parameter information 12C stored in the memory 150. In the case where the parameter information 12C has been updated (step S202; Yes), the executor 166 transfers control to the display controller 165. The display controller 165 controls the display 110 to replace the parameter information 12C being displayed (a bid value) with the updated parameter information 12C (a bid value) (step S203). In the case where the parameter information 12C (a bid value) has not been updated (step S202; No) the executor 166 ends the flow execution process.

Figure 15:
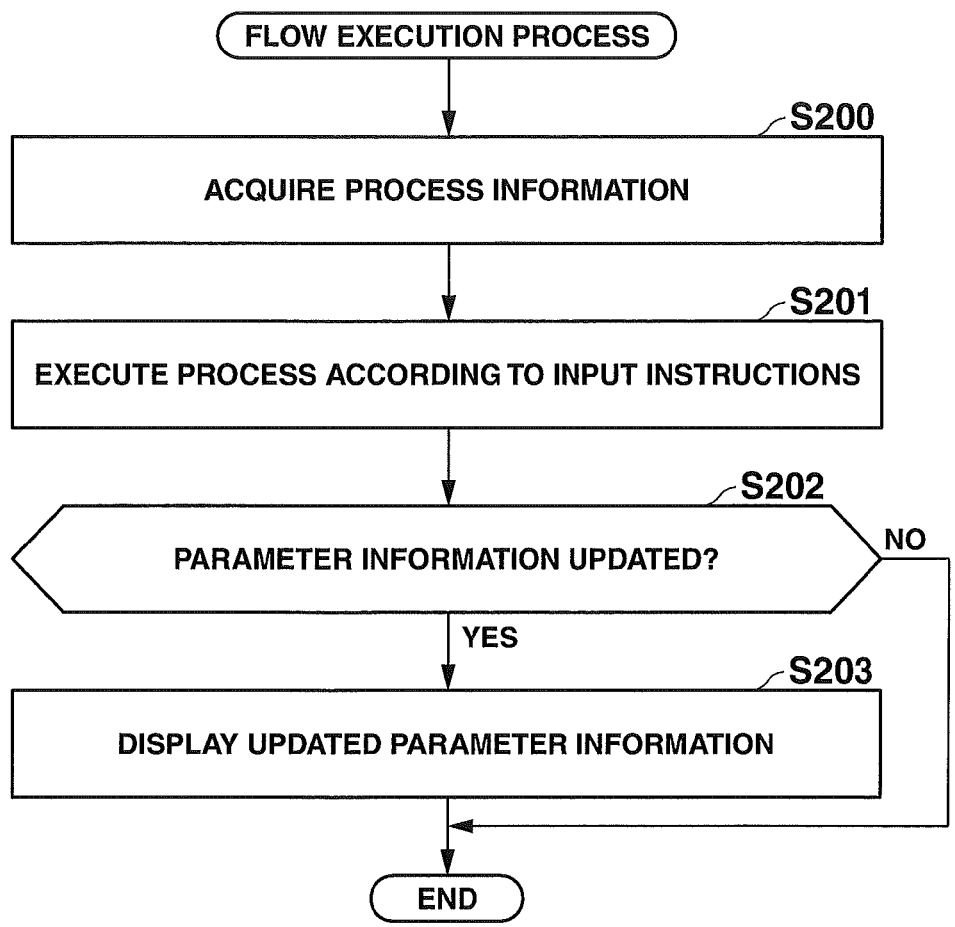
FIG. 15 is a flowchart of a flow execution process according to the second embodiment.

The executor 166 executes the flow execution process illustrated in FIG. 15 every time instructions to increment the parameter information 12C (a bid value) are input via the content 11C' and detected. 1000 is added to the parameter information 12C corresponding to the tag ID_200 (521) each time the executor 166 executes the flow execution process. Also, the executor 166 executes the flow execution process every time instructions to decrement the parameter information 12C are input via the content 11D'. 1000 is subtracted from the parameter information 12C corresponding to the tag ID_200 (521) each time the executor 166 executes the flow execution process.

Similarly, when instructions to transmit parameter information to the server 300 are input into the executor 166 via the content 11E', the executor 166 executes the flow execution process illustrated in FIG. 15. The executor 166 acquires process information included in the provided information (step S200), and generates instruction information 622 to update the parameter information stored by the server 300 to the parameter information included in upload information. Additionally, the executor 166 associates the tag ID_200 (521) and the generated instruction information 622 to generate the response information 600 illustrated in FIG. 13C, and uploads (transmits) the response information 600 to the server 300 (step S201). Note that the response information 600 includes user account information in order for the server 300 to manage the user with the updated bid value. The executor 166 determines whether or not the parameter information has been updated (step S202), and upon determining that the parameter information has not been updated (step S202; No), ends the flow execution process. At the server 300, the bid value for the object 10B is updated on the basis of the received response information 600.

As described above, in an information processing system according to the present embodiment, associating a single piece of identification information (a tag ID) with multiple GUI programs enables changing the instructions to input according to the content being displayed. In addition, by changing the process indicated by process information according to the instruction details, complex processes, such as controlling the timing at which to update parameter information, become executable.

Third Embodiment

In the foregoing embodiments, when plural content is being displayed on a display screen, for example, executing a process that ranks the plural content in an arbitrary order, or specifies content that forms a pair, is possible. Accordingly, an embodiment enabling a process that accounts for information related to multiple tag IDs included in provided information will be hereinafter described.

As illustrated in FIG. 16A, the provided information 500 includes optional information as information corresponding to a tag ID. This optional information is made up of an ID group list (group information) that groups tag IDs. In the provided information 500 illustrated in FIG. 16A, the tag IDs constituting an ID group list are the tag IDs ID_300, ID_400, and ID_500 (551 to 571). An ID group list indicates that the tag IDs ID_300, ID_400, and ID_500 (551 to 571) are tag IDs belonging to the same group.

The process indicated by the process information in FIG. 16B is a process for ranking content (552 to 572) that respectively corresponds to the tag IDs ID_300, ID_400, and ID_500 (551 to 571). The ID group list is referenced as part of this process.

Such process information is assigned to all tag IDs belonging to the same group.

Hereinafter, operation of the information processing system 10 according to the present embodiment will be described.

Figure 17:
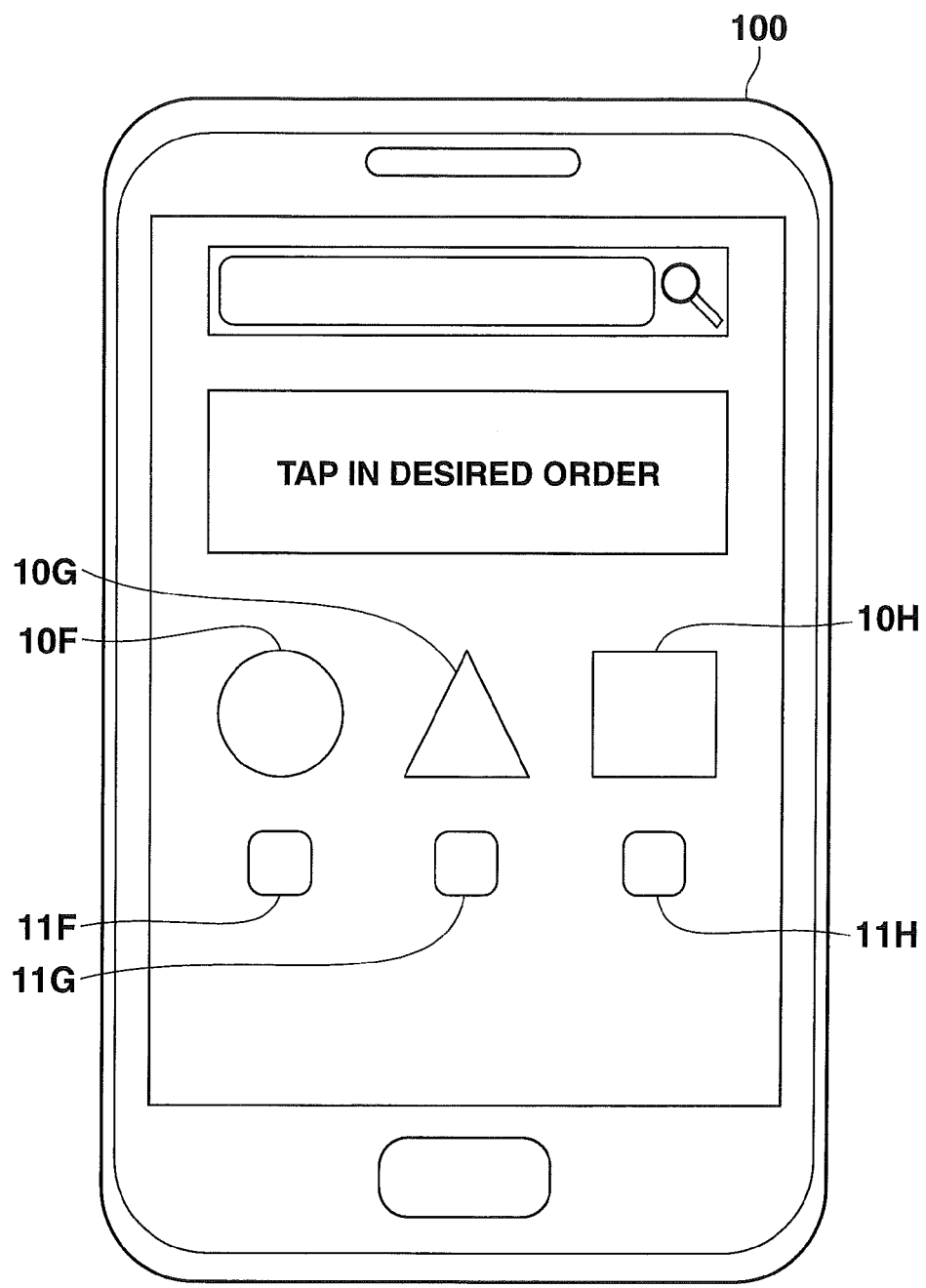
FIG. 17 is a diagram illustrating an exemplary display on a client device according to the third embodiment.

As illustrated in FIG. 17, objects 10F to 10H, as well as content 11F to 11H (corresponding to 552 to 572) that corresponds to each object, are displayed on a display screen. The user ranks the content 11F to 11H by tapping (touching) the content 11F to 11H in an order. As an example, the process will be described for the case of tapping the content 11F first from among the content 11F to 11H. Information indicating that a tap was performed via the content 11F, and the tag ID_300 (551), are input into the executor 166. When such information is input, the executor 166 starts the flow execution process illustrated in FIG. 9. When the process starts, the executor 166 acquires process information 554 corresponding to the tag ID_300 (551) (step S200).

The executor 166 executes a process on the basis of the acquired process information 554 (step S201). On the basis of the process (1) illustrated in FIG. 16B, the executor 166 acquires a number, which is generated by the response information 600 that includes the tag ID, for the other tag IDs ID_400 and ID_500 (561, 571) constituting the ID group list. Note that since the response information 600 has not been generated yet, "0" is acquired. Next, the executor 166 adds 1 to the acquired number "0", on the basis of the process in (2) illustrated in FIG. 16B. The added number "1" indicates the rank assigned to the content 11F. Additionally, the executor 166 acquires the number of tag IDs constituting the ID group list. The number of tag IDs indicates the number of content items being ranked. Since there are three tag IDs constituting the ID group list (the tag IDs ID_300, ID_400, and ID_500 (551 to 571)), the acquired number of tag IDs is "3". The executor 166 combines the acquired "1" and "3" to generate upload information 632 stating "rank 1/3". "Rank 1/3" indicates that, among the content being ranked, the content 11F is ranked first. The executor 166 generates response information 600 made up of the tag ID_300 (551) input from the content 11F and the upload information 632. When the response information 600 is generated, the executor 166 determines whether or not response information 600 has been generated for all tag IDs constituting the ID group list, on the basis of the process (3) illustrated in FIG. 16B. Since response information 600 has not been generated for the tag IDs ID_400 and ID_500, the executor 166 ends the flow execution process.

Subsequently, if information indicating that a tap was performed via the content 11H, and the tag ID_500 (571), are input into the executor 166, the executor 166 executes step S201 and step S202 illustrated in FIG. 15. In step S201, the executor 166 generates upload information 652 stating "rank 2/3", which indicates that from among the content being ranked, the content 11H is ranked second. The executor 166 generates response information 600 made up of the tag ID_500 (571) and the upload information 652. Next, since response information 600 has not been generated for the tag ID_400, the executor 166 ends the flow execution process.

Additionally, if information indicating that a tap was performed via the content 11G, and the tag ID_400 (561), are input into the executor 166, the executor 166 executes step S201 and step S202 illustrated in FIG. 15. In step S201, the executor 166 generates upload information 642 stating "rank 3/3", which indicates that from among the content being ranked, the content 11G is ranked third. The executor 166 generates response information 600 made up of the tag ID_400 (561) and the upload information 642. Next, since response information 600 has been generated for all tag IDs constituting the ID group list, the executor 166 transmits the response information 600 corresponding to the tag IDs ID_300, ID_400, and ID_500 (551 to 571) to the server 300.

At the server 300, when the response information 600 received from the client device 100 is input into the parameter updater 352, the parameter updater 352 starts the parameter information update process illustrated in FIG. 10. When the process starts, the parameter updater 352 acquires the upload information 632 to 652 from the response information 600 (step S300). In the case where the acquired upload information 632 to 652 is information indicating a content ranking, the parameter updater 352 stores this information in the memory 340 as parameter information (555 to 575) corresponding to the tag IDs ID_300, ID_400, and ID_500 (551 to 571) (step S301). Thus, the parameter information 555 corresponding to the tag ID_300 (551) becomes "rank 1/3", the parameter information 565 corresponding to the tag ID_400 (561) becomes "rank 3/3", and the parameter information 575 corresponding to the tag ID_500 (571) becomes "rank 2/3".

As described above, in an information processing system 10 according to the present embodiment, an ID group list is added to provided information, and this list is referenced as part of a process indicated by process information. Consequently, executing a process that accounts for information related to multiple tag IDs included in provided information is possible.

Note that although the above description describes the invention by taking as an example a process that ranks content, any kind of process is acceptable insofar as the process is executable by referencing an ID group list included in provided information. For example, if identification information included in an ID group list is specified via content, the process may be a process that adds, to the parameter information, information indicating that the content corresponding to that identification information forms a pair (a pair specifying process). Alternatively, if particular identification information is specified via content in a state where content corresponding to identification information included in the above list is being displayed in a row from left to right, the process may be a process that updates the parameter information for the content being displayed to the left or right of the content corresponding to the particular identification information (a boundary specifying process). Furthermore, if identification information included in an ID group list is specified via content, the process may be a process that updates the parameter information for content which is displayed within a given distance from the content corresponding to that identification information, and which is identified by the above list (an area specifying process).

Also, in the foregoing embodiments, the method of inputting instructions is arbitrary, and may also be, for example, an input method in which YES/NO buttons are displayed and one is selected, an input method in which three radio buttons are displayed and one is selected (a "choose one out of three" input method), a method in which a value is input by operating a slide bar, or the like. Furthermore, in the foregoing embodiments, process information corresponding to a tag ID is stated as "upon receiving instructions to increment the parameter information (the Like count), generate instruction information to increment the parameter information by 1, and transmit (upload) to the server 300 in association with the tag ID" (first embodiment). However, in the cases where immediately refreshing the display screen is important, a potential process is "upon receiving instructions to increment the parameter information (the Like count), first, increment the parameter information by 1 and update the display of count information to reflect the increment, and after that, generate instruction information, transmit (upload) to the server 300 in association with the tag ID, and upon receiving the updated, most recent parameter information from the server 300, replace the parameter information". This case, although not accurate, has the merit of being able to immediately refresh the display screen if a user performs an instruction operation.

The present invention is not limited to the foregoing embodiments, and various modifications and application are possible.

In the foregoing embodiments, although provided information is transmitted from the server 300 to the client device 100, the information that must be unilaterally managed by the server 300 is the parameter information, and transmitting other types of information (such as content, process information, and options) from an arbitrary device is also acceptable. For example, transmitting information such as content from the illumination device 200 to the client device 100 is also possible.

Figure 18:
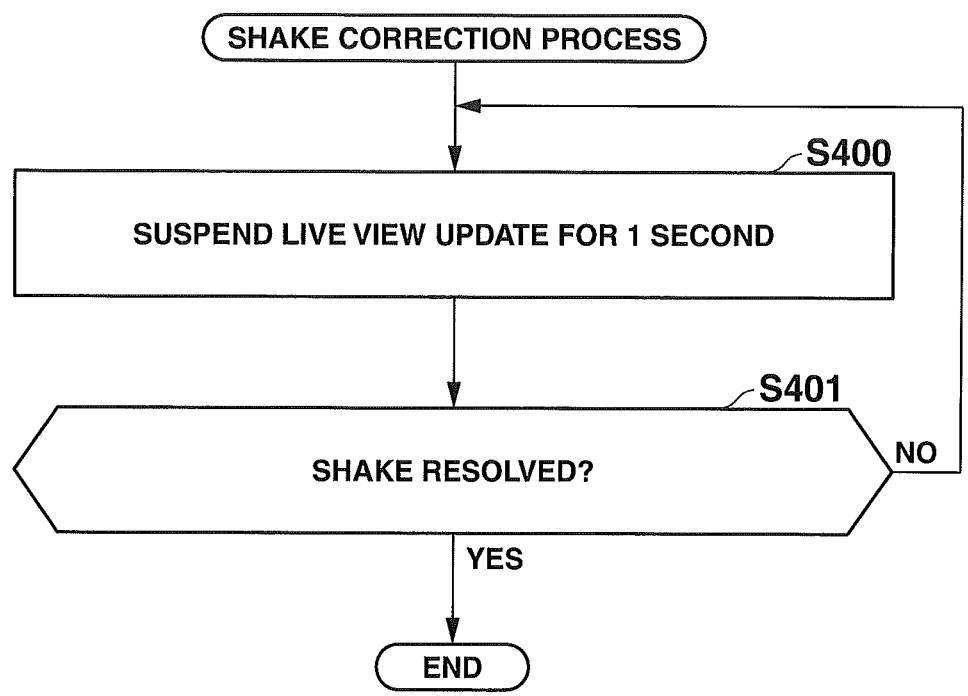
FIG. 18 is a flowchart of a shake correction process.

Also, in the foregoing embodiments, although live-view images (through-the-lens images) are continuously displayed over time, temporarily suspending display screen updates or the like is also possible. For example, in the case where the client device 100 moves, a live-view image is potentially not updated for a given amount of time for the purpose of shake correction. For example, update of the display is potentially suspended temporarily or the like when the shake detector 170 disposed in the client device 100 detects shaking (acceleration or contact with the touch sensor). In this case, the controller 160 starts the shake correction process illustrated in FIG. 18 in response to a shake detection signal output by the shake detector 170, for example. When the shake correction process starts, the controller 160 first suspends update of the live view for one second (step S400), and after that, determines whether or not the shaking is resolved (step S401). Accordingly, if the shaking is resolved (step S401; Yes), the controller 160 ends the shake correction process, and if the shaking is not resolved (step S401; No), the controller 160 once again executes step S400.

With such shake correction, displaying live-view images with high image quality is possible, even if shaking occurs.

Note that the specific configuration of the illumination device (transmitting device) 200 is arbitrary insofar as the device converts content identification information into a blinking optical signal, and outputs the optical signal into the surroundings. For example, a portable device that is carried by a user, and a device that is installed on the roof of a building or in an arbitrary room, are also possible. Also, light information that varies in brightness is possible, information that varies in hue is also possible.

Also, any information processing device is acceptable as the client device 100, insofar as the device is able to acquire content identification information from the illumination device 200 by image capture, and communicate with an access point. For example, devices such as a Personal Handyphone System (PHS), a personal digital assistant or personal data assistance (PDA), a smartphone, a tablet PC (personal computer), a game console, or a portable music player are also possible.

Also possible is the preparation of a device equipped with both the functions of the client device 100 and the functions of the illumination device 200, and configured to use both functions appropriately depending on the situation.

Also, in each of the foregoing embodiments, a program to be executed is potentially stored and distributed on a computer-readable recording medium such as a flexible disk, a Compact Disc-Read-Only Memory (CD-ROM), a Digital Versatile Disc (DVD), or a magneto-optical disc (MO), such that a system that executes the processes discussed earlier is constituted by installing the program.

Also, the program is potentially stored in a disk device or the like included in a given server device on a network system NW such as the Internet, in which the program is impressed onto a carrier wave and downloaded or the like, for example.

Note that in cases such as where the functions discussed above are realized under the supervision of an OS, or by cooperative action between an OS and an application, only the portions other than the OS are potentially stored and distributed on a medium, or alternatively, downloaded or the like.

Additionally, various embodiments and modifications of the present invention are possible without departing from the scope and spirit of the present invention in the broad sense. In other words, although several embodiments of the present invention have been described, the foregoing embodiments are for the purpose of describing the present invention, and do not limit the scope of the present invention. The scope of the present invention includes the scope of the invention as stated in the claims and their equivalents, rather than the embodiments.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An information processing system comprising:
    a server provided with memory that associates and stores identification information and content;
    a transmitting device that transmits the identification information, using light that varies over time as a communication medium; and
    a client device that includes:
        an image capture device;
        a display;
        an input device operable to receive an input by a user;
        a communication device; and
        a controller configured to:
            control the image capture device to sense the light that varies over time;
            decode the light that varies over time that is sensed by the image capture device, into the identification information;
            transmit the decoded identification information to the server via the communication device;
            receive, via the communication device, content transmitted from the server in response to the transmission of the identification information from the client device;
            control the display to display a live-view image captured by the image device, the live-view image including a position of the light that varies over time;
            control the display to display the received content in association with the position of the light that varies over time in the live-view image;
            detect, via the input device, an external operation performed on the content displayed by the display; and
            transmit detection details of the detection of the external operation to the server, via the communication device;
    wherein the server includes a memory controller that controls the memory to update the content based on the detection details transmitted by the client device;
    wherein the client device further comprises a shake detector that detects shaking; and
    wherein, in a case in which the shake detector detects shaking, the controller controls the display not to update the live-view image.

2. The information processing system according to claim 1, wherein the detection details include process details according to the detection, and the controller transmits the process details to the server via the communication device; and
    wherein the memory controller executes the process details, and controls the memory to update the content to content that includes execution results of the process details.

3. The information processing system according to claim 2, wherein the process details are details for a process that updates content that has become an object of the external operation.

4. The information processing system according to claim 2, wherein the process details include process details according to detection of a selection of a particular choice from among a plurality of choices prepared in advance.

5. The information processing system according to claim 1, wherein in a case in which the controller controls the display to display a plurality of content, the controller additionally transmits identification information of content on which the external operation is performed to the server via the communication device.

6. The information processing system according to claim 5, wherein the plurality of content are additionally associated with each other, and in a case in which the controller detects external operations indicating a ranking of the plurality of content associated with each other, the controller additionally transmits the ranking to the server via the communication device.

7. An information processing method for a system that includes (i) a server provided with memory that associates and stores identification information and content, (ii) a transmitting device that transmits the identification information, using light that varies over time as a communication medium, and (iii) a client device including an image capture device, a communication device, a shake detector, and a display, the information processing method comprising:
    performing, by the client device:
        controlling the image capture device to sense the light that varies over time;
        decoding the light that varies over time that is sensed by the image capture device, into the identification information;
        transmitting the decoded identification information to the server via the communication device;
        receiving, via the communication device, content transmitted from the server in response to the transmission of the identification information from the client device;

controlling the display to display a live-view image captured by the image capture device, the live-view image including a position of the light that varies over time;

controlling the display to display the received content in association with the position of the light that varies over time in the live-view image;

detecting an external operation performed on the content displayed by the display; and transmitting detection details of the detection of the external operation to the server, via the communication device; and performing, by the server:

updating the content based on the detection details transmitted by the client device;

wherein the method further comprises, performing, by the client device:

detecting shaking, by the shake detector; and in a case in which the shake detector detects shaking, controlling the display not to update the live-view image.

8. A client device comprising:

an image capture device;

a display;

an input device operable to receive an input by a user;

a communication device; and a controller configured to:

control the image capture device to sense light that varies over time;

decode the light that varies over time that is sensed by the image capture device, into identification information;

transmit the decoded identification information to an external server via the communication device;

receive, via the communication device, content transmitted from the external server in response to the transmission of the identification information from the client device;

control the display to display a live-view image captured by the image capture device, the live-view image including a position of the light that varies over time;

control the display to display the received content in association with the position of the light that varies over time in the live-view image;

detect, via the input device, an external operation performed on the content displayed by the display; and transmit detection details of the detection of the external operation to the external server, via the communication device;

wherein the client device further comprises a shake detector that detects shaking; and wherein, in a case in which the shake detector detects shaking, the controller controls the display not to update the live-view image.

9. The client device according to claim 8, wherein the detection details include process details according to the detection, and the controller transmits the process details to the external server via the communication device.

10. The client device according to claim 9, wherein the process details are details for a process that updates content that has become an object of the external operation.

11. The client device according to claim 9, wherein the process details include process details according to detection of a selection of a particular choice from among a plurality of choices prepared in advance.

12. The client device according to claim 8, wherein in a case in which the controller controls the display to display a plurality of content, the controller additionally transmits identification information of content on which the external operation is performed to the external server via the communication device.

13. The client device according to claim 12, wherein the plurality of content are additionally associated with each other, and in a case in which the controller detects external operations indicating a ranking of the plurality of content associated with each other, the controller additionally transmits the ranking to the external server via the communication device.

14. An information processing method for a client device including an image capture device, a communication device, a shake detector, and a display, the information processing method comprising:

controlling the image capture device to sense the light that varies over time;

decoding the light that varies over time that is sensed by the image capture device, into the identification information;

transmitting the decoded identification information to an external server via the communication device;

receiving, via the communication device, content transmitted from the external server in response to the transmission of the identification information from the client device;

controlling the display to display a live-view image captured by the image capture device, the live-view image including a position of the light that varies over time;

controlling the display to display the received content in association with the position of the light that varies over time in the live-view image;

detecting an external operation performed on the content displayed by the display;

transmitting detection details of the detection of the external operation to the external server, via the communication device;

detecting shaking, by the shake detector; and in a case in which the shake detector detects shaking, controlling the display not to update the live-view image.

15. A non-transitory recording medium storing a computer-readable program that executable by a computer of a client device that includes an image capture device, a communication device, a shake detector, and a display, the program being executable to perform functions comprising:

controlling the image capture device to sense the light that varies over time;

decoding the light that varies over time that is sensed by the image capture device, into the identification information;

transmitting the decoded identification information to an external server via the communication device;

receiving, via the communication device, content transmitted from the external server in response to the transmission of the identification information from the client device;

controlling the display to display a live-view image captured by the image capture device, the live-view image including a position of the light that varies over time;

controlling the display to display the received content in association with the position of the light that varies over time in the live-view image;

detecting an external operation performed on the content displayed by the display;

transmitting detection details of the detection of the external operation to the external server, via the communication device;

detecting shaking, by the shake detector; and in a case in which the shake detector detects shaking, controlling the display not to update the live-view image.

* * * * *